United States Patent
Takeda

(10) Patent No.: US 7,894,313 B2
(45) Date of Patent: *Feb. 22, 2011

(54) OPTICAL DISC RECORDING AND REPRODUCING APPARATUS

(75) Inventor: Futoshi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 373 days.

This patent is subject to a terminal disclaimer.

(21) Appl. No.: 12/078,916

(22) Filed: Apr. 8, 2008

(65) Prior Publication Data

US 2008/0259776 A1    Oct. 23, 2008

(30) Foreign Application Priority Data

Apr. 9, 2007   (JP)   ............................ P2007-101551

(51) Int. Cl.
*G11B 7/00*   (2006.01)
(52) U.S. Cl. ................................. 369/44.32; 369/44.41
(58) Field of Classification Search ........................ None
See application file for complete search history.

(56) References Cited

U.S. PATENT DOCUMENTS

2006/0215521 A1*   9/2006   Yak et al. .................. 369/53.23

FOREIGN PATENT DOCUMENTS

JP            2000-315327         11/2000

* cited by examiner

*Primary Examiner*—Wayne R Young
*Assistant Examiner*—Brian Butcher
(74) *Attorney, Agent, or Firm*—Morgan, Lewis & Bockius LLP

(57) ABSTRACT

An optical pickup has a photo detector which is divided into first, second, third and fourth quadrants, receives a laser beam reflected from an optical disc via an objective lens, and outputs first, second, third and fourth detection signals from the respective quadrants. A system controller controls a memory to store levels (A, B, C and D) of the first, second, third and fourth detection signals after a focus servo section performs a focus operation by shifting the objective lens in a direction perpendicular to the optical disc surface, and then, calculates a ratio of $((A+D)/(B+C))$ in a radial direction of the optical disc. The system controller controls the tracking servo section to perform a tracking operation to shift the objective lens in the radial direction based on a correction table which represents a relationship between correction amount of the lens shift and the calculated ratio $((A+D)/(B+C))$.

4 Claims, 7 Drawing Sheets

CORRECTION TABLE

| α | | CORRECTION AMOUNT OF LENS SHIFT |
|---|---|---|
| MIN | MAX | |
| — | −3.0 | +110 |
| −3.0 | −1.5 | +55 |
| −1.5 | +1.5 | +0 |
| +1.5 | +3.0 | −55 |
| +3.0 | — | −110 |

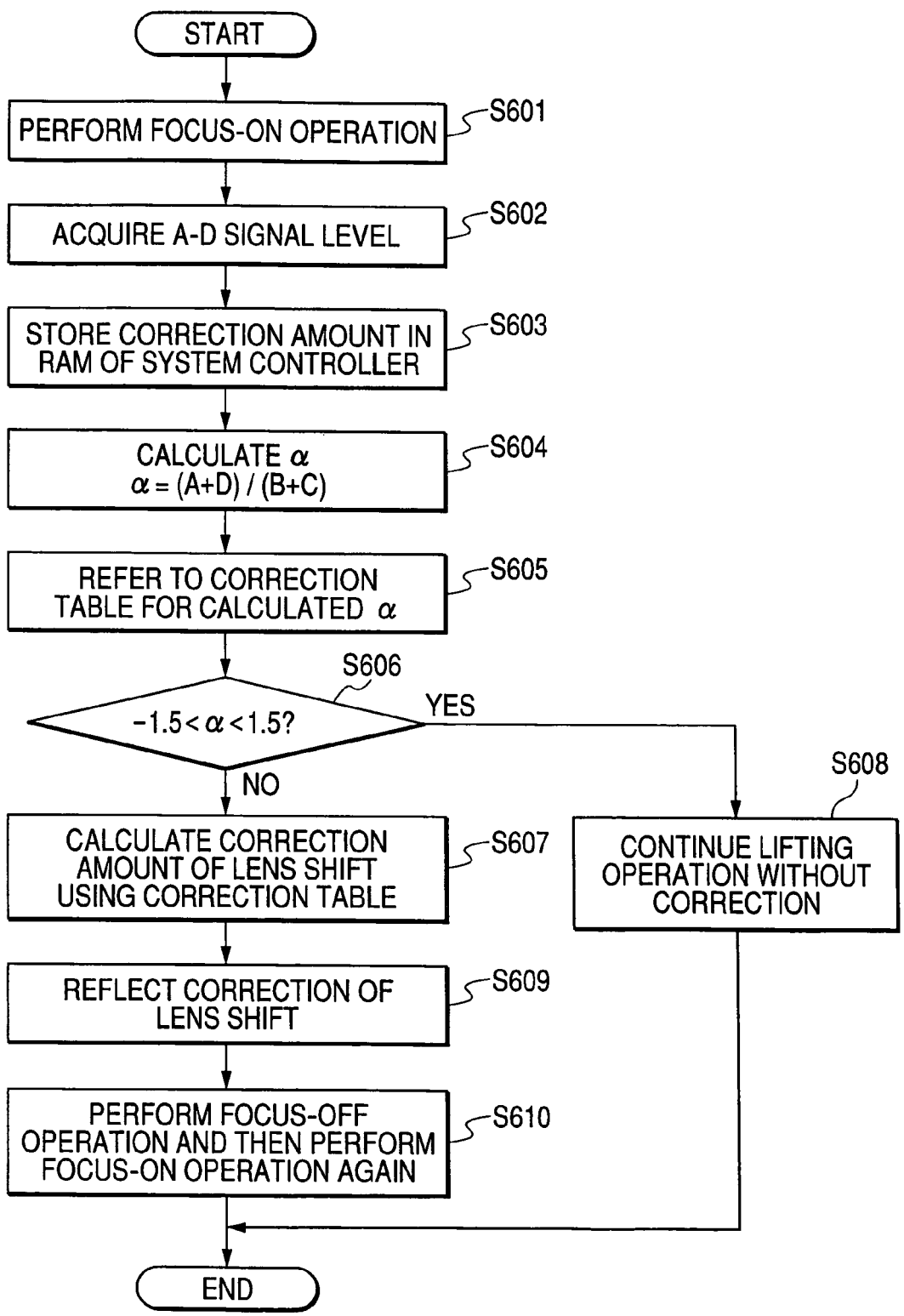

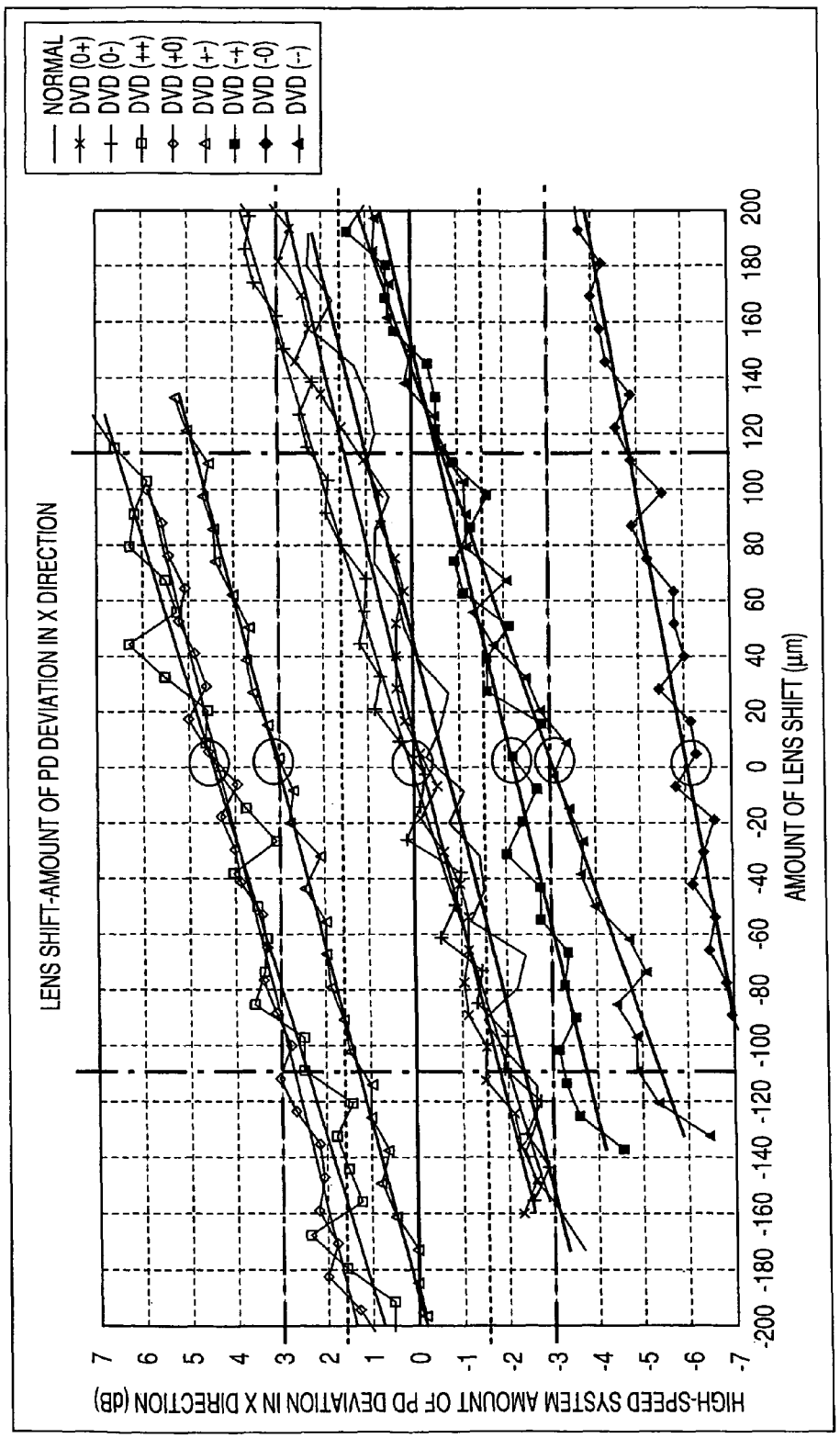

OPTICAL DISC RECORDING AND REPRODUCING APPARATUS

The disclosure of Japanese Patent Application No. 2007-101551 filed on Apr. 9, 2007 including specification, drawings and claims is incorporated herein by reference in its entirety.

BACKGROUND

The present invention relates to ah optical disc recording and reproducing apparatus that reproduces information recorded in an optical disc, and more particularly, to a process for correcting light reception deviation of a photo detector due to lens shift in a search operation of an optical pickup.

Generally, in optical disc reproducing apparatuses, a tracking servo operation for an optical pickup is performed based on a tracking error signal. More particularly, the tracking servo operation is performed in accordance with a track cross signal of which a pulse width changes in accordance with the amount (the amount of deviation on the inner peripheral side or outer peripheral side of a track on the optical disc) of shift of an objective lens included in an optical pickup with respect to a thread in which the optical pickup is built.

For example, when the objective lens is shifted to the inner peripheral side of a track on the optical disc, the location of the objective lens is controlled to be in a normal position with respect to the track by applying a tracking drive voltage to a tracking actuator such that the objective lens is moved in the direction of the outer peripheral side for returning the objective lens to a normal position with respect to the track by a tracking servo on the basis of the track cross signal at that moment.

However, in the general optical disc reproducing apparatuses, the following process is performed by a system controller until the focus servo is turned on. Here, the process will be explained assuming that a DVD is inserted into the optical disc reproducing apparatus.

The system controller acquires a sum signal of (A+B+C+D) and a focus error signal (A+C)-(B+D) from a four-division photo detector in a state that a DVD laser diode is turned on. Then, the system controller acquires a sum signal of (A+B+C+D) and a focus error signal (A+C)-(B+D) in a state that the DVD laser diode is turned off and a CD laser diode is turned on, similarly.

Then, the system controller determines that the inserted disc is a DVD, if the level of disc type determination signal ((A+C)-(B+D))/(A+B+C+D) acquired in a state that the DVD laser diode is turned on is higher than the level of the disc type determination signal ((A+C)-(B+D))/(A+B+C+D) acquired in a state that the CD laser diode is turned on. Then the system controller individual the levels of detection signals A, B, C, and D to be a constant level, which have been transmitted from the four-division photo detector in a state that the DVD laser diode is turned on. Next, the system controller performs an S-letter balance adjustment operation for the focus error signal of (A+C)-(B+D) acquired in a state that the DVD laser diode is turned on and a focus lead-in setting operation for leading in the focus servo. Thereafter the system controller turns on the focus servo.

In the general optical disc reproducing apparatuses, the spot of a laser beam emitted from the optical pickup is controlled to be in a track-on state for a track on an optical disc by turning on the focus servo for performing a focus-on operation and then turning on the tracking servo. However, when a de-track (a state that a track-on operation is performed from a location deviated from the center of a track) occurs in a process up to the above-described process for turning on the focus servo, even if the focus-on operation is performed in the state, a laser beam is projected onto a location deviated from the center of the track. As a result, the jitter of a reproduction signal is deteriorated, and accordingly, there is a problem that the reproduction quality of the optical disc is degraded. In addition, for a next-generation DVD such as a Blu-ray DISC or an HD DVD that has become widespread in the market, the memory capacity is used at high precision, and accordingly, the track pitch thereof is narrowed markedly, compared to that of a general optical disc such as a CD or a DVD. As a result, high-precision tracking is desired.

In addition, in general technology disclosed in Patent Document 1, in various optical reproducing apparatuses, means in which a tangential phase difference is intentionally deviated, and the amount of lens shift is detected based on an offset of the phase difference and is corrected, and a balance adjustment operation of the tracking error is performed is disclosed. According to the technology disclosed in Patent Document 1, a minute deviation of tracking that frequently occurs in a reproduction process can be corrected. However, it is difficult to correct deviation of an optical spot generated in a manufacturing process of each optical pickup.

Patent Document 1: Japanese Patent Publication No. 2000-315327A

SUMMARY

Accordingly, it is an object of the invention to provide an optical disc recording and reproducing apparatus capable of reducing de-track by detecting the amount of light reception deviation of the photo detector of the optical pickup in the radial direction of an optical disc after a focus-on operation of the optical pickup for the optical disc to be reproduced and by moving and lifting the objective lens of the optical pickup in a direction for canceling the amount of the deviation.

In order to achieve the above objects, according to an aspect of the invention, there is provided an optical disc recording and reproducing apparatus comprising: an optical pickup that has a photo detector of which a light reception area is divided into four areas including a first quadrant, a second quadrant, a third quadrant and a fourth quadrant by an X-axis and a Y-axis in a case where a radial direction of an optical disk is set to the X-axis and a track direction of the optical disc is set to the Y-axis, and that is configured to project a laser beam emitted from a laser diode onto the optical disc through an objective lens, receive the laser beam reflected from the optical disc by the photo detector, and output first, second third and fourth detection signals from the first, second, third and fourth quadrants of the light areas; a focus servo section that is configured to shift the objective lens in a direction perpendicular to a recording surface of the optical disc; a system controller that is interconnected between the optical pickup and the focus servo section and is operable to control the optical pick up; a first memory that is configured to store levels of the first, second, third and fourth detection signals which are detected by the photo detector as A, B, C and D when the focus servo section lifts the objective lens up in a state that the laser diode is turned on; a tracking servo section that is configured to shift the objective lens in the radial direction of the optical disc; and a second memory that stores a correction table which represents a relationship between a ratio of ((A+D)/(B+C) in the X-axis and a correction amount of lens shift in a stepped manner within a movable range of the objective lens; wherein the system controller calculates the ratio of ((A+D)/(B+C)) based on the levels A, B, C and D which are stored in the first memory after the focus servo section performs a focus-on operation; wherein the system controller controls the tracking servo section to perform a tracking operation so as to shift the objective lens in the direction of the X-axis by the correction amount with respect to the calculated ratio ((A+D)/(B+C)) based on the correction table.

According to another aspect of the invention, there is provided an optical disc recording and reproducing apparatus comprising: an optical pickup that has a photo detector of which a light reception area is divided into four areas including a first quadrant, a second quadrant, a third quadrant and a fourth quadrant by an X-axis and a Y-axis in a case where a radial direction of an optical disk is set to the X-axis and a track direction of the optical disc is set to the Y-axis, and that is configured to project a laser beam emitted from a laser diode onto the optical disc through an objective lens, receive the laser beam reflected from the optical disc by the photo detector, and output first, second third and fourth detection signals from the first, second, third and fourth quadrants of the light areas; a focus servo section that is configured to shift the objective lens in a direction perpendicular to a recording surface of the optical disc; a system controller that is interconnected between the optical pickup and the focus servo section and is operable to control the optical pick up; a memory that is configured to store levels of the first, second, third and fourth detection signals which are detected by the photo detector as A, B, C and D when the focus servo section lifts the objective lens up in a state that the laser diode is turned on; and a tracking servo section that is configured to shift the objective lens in the radial direction of the optical disc, wherein the system controller controls the memory to store levels of the first, second, third and fourth detection signals as A, B, C and D after the focus servo section performs a focus-on operation, and then, calculates a ratio of ((A+B)/(B+C)) in the direction of the X-axis; and wherein the system controller controls the tracking servo section to perform a tracking operation so as to shift the objective lens in the direction of the X-axis based on a correction table which represents a relationship between correction amount of the lens shift and the calculated ratio ((A+D)/(B+C)).

The correction amount of the lens shift may be set with respect to the ratio of ((A+D)/(B+C)) in a stepped manner within a movable range of the objective lens.

The optical disc recording and reproducing apparatus may reproduce at least one of a CD, a DVD, a Blu-ray Disc and an HD DVD.

With the above-described configuration, a photo detection deviation of an optical pickup which is generated in a manufacturing process thereof is corrected. In the manufacturing process of the optical pickup, the photo detection deviation may be generated due to a displacement of an attaching position of the photo detector.

Further, it is possible to reduce the photo detection deviation of the optical pickup by shifting the objective lens of the optical pickup in the direction of the X-axis based on the correction table which is stored in advance. In addition, the shift amount of the objective lens is controlled within a movable range, and accordingly, it is possible to prevent deviation of the objective lens from a track.

BRIEF DESCRIPTION OF THE DRAWINGS

The above objects and advantages of the present invention will become more apparent by describing in detail preferred exemplary embodiments thereof with reference to the accompanying drawings, wherein;

FIG. 7 is a flowchart showing a control operation according to the embodiment; and FIG. 8 shows verification data of values included in a correction table according to the embodiment.

DETAILED DESCRIPTION OF THE EMBODIMENTS

Figure 1:
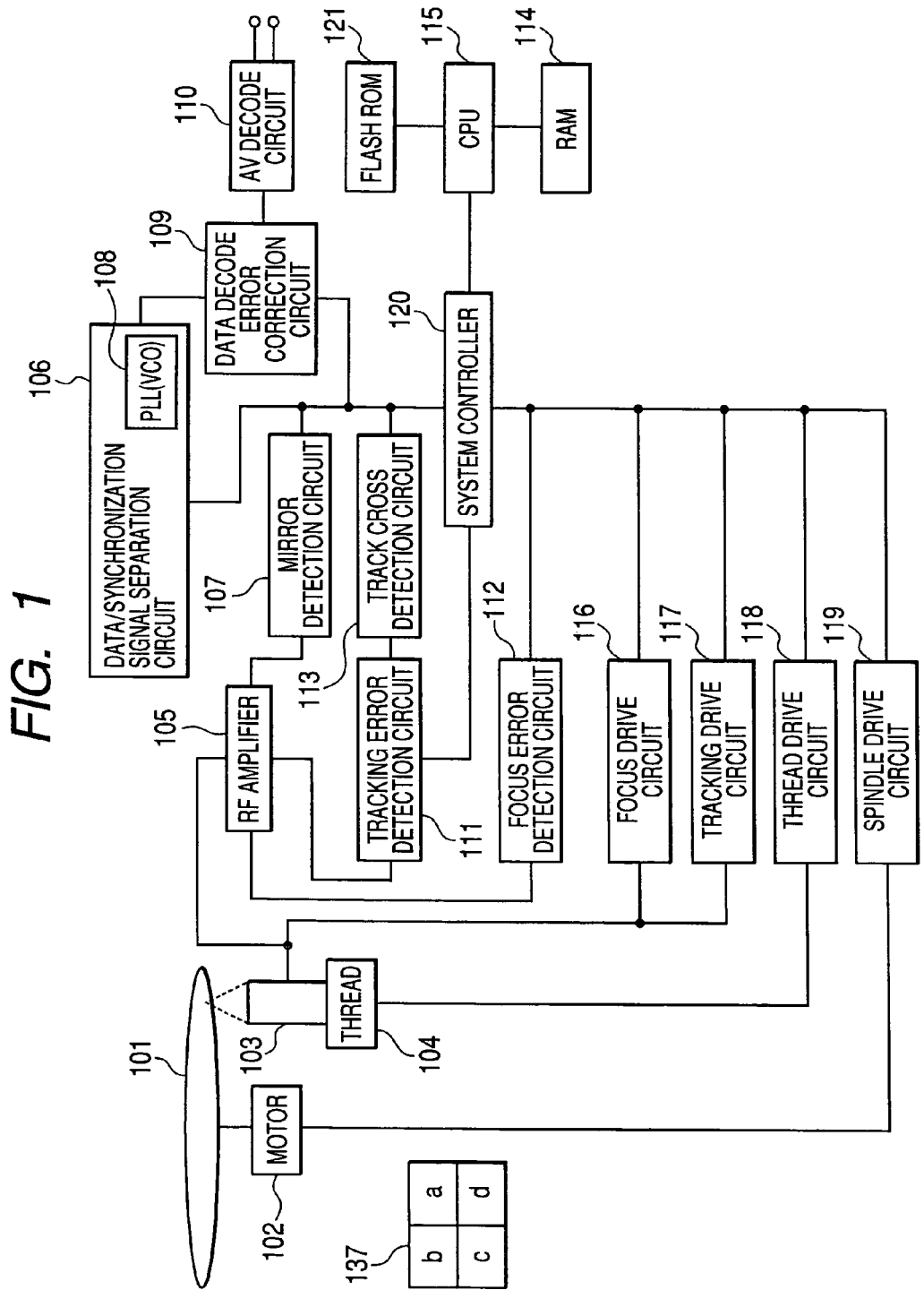
FIG. 1 is a block diagram showing the configuration of an optical disc reproducing apparatus according to an embodiment of the present invention.

Hereinafter, embodiments of the present invention will be described with reference to the accompanying drawings. FIG. 1 is a block diagram showing the configuration of an optical disc reproducing apparatus according to an embodiment of the present invention. The optical disc reproducing apparatus shown in FIG. 1 includes an optical pickup 103 that emits a laser beam and receives the laser beam reflected from an optical disc 101 for reproducing information stored in the optical disc 101, a spindle motor 102 that rotates the optical disc 101, a spindle drive circuit 119 that drives the spindle motor 102, a tracking drive circuit 117 that drives a tracking actuator 231 (see FIG. 3) performing a tracking servo operation for the optical pickup 103, a focus drive circuit 116 that drives a focus actuator 232 (see FIG. 3) performing a focus servo operation for the optical pickup 103, a thread 104 that moves the optical pickup 103 in the radial direction of the optical disc 101, and a thread drive circuit 118 that drives the thread 104.

In addition, the optical disc reproducing apparatus includes an RF amplifier 105 that receives a reproduction signal (read signal) from the optical pickup 103, generates an RF signal based on the reproduction signal, and amplifies the RF signal for reproduction of the optical disc 101, a data/synchronization signal separation circuit 106 that receives the RF signal from the RF amplifier 105 having a PLL (phase locked loop) 108 including a VCO (voltage controlled oscillator) and separates data and a synchronization signal, a data decode error correction circuit 109 that performs an error checking operation by receiving and decoding the data separated by the data/synchronization signal separation circuit 106 and outputs correct data by performing an error correction operation in a case where there is an error in the data, and an AV decode circuit 110 that receives the correct data from the data decode-error correction circuit 109, decodes the correct data, and outputs a video signal and an audio signal.

In addition, the disc reproducing apparatus includes a mirror detection circuit 107 that detects a mirror signal included in the RF signal transmitted from the RF amplifier 105 and representing a mirror surface on which there is no track on the optical disc 101 and counts the mirror surface, a tracking error detection circuit 111 that detects a tracking error signal included in the reproduction signal transmitted from the optical pickup 103, a focus error detection circuit 112 that detects a focus error signal included in the reproduction signal transmitted from the optical pickup 103, and a track cross detection circuit 113 that detects track cross based on the tracking error signal transmitted from the tracking error detection circuit 111 and outputs a track pulse.

In addition, the optical disc reproducing apparatus includes a system controller 120 that controls the above-described constituent elements in accordance with a CPU 115 performing processes for the whole device. To the CPU 115, a flash ROM 121 in which a program, data, and the like required for a control operation of the system controller 120 are stored, and a RAM 114 in which data required for a calculation or process operation of the CPU 115 is temporarily stored are connected. The system controller 120 performs a control operation for a focus servo of the optical pickup 103 on the basis of the focus error signal included in the reproduction signal transmitted from the optical pickup 103, a control operation for a tracking servo of the optical pickup 103 on the basis of the tracking error signal included in the reproduction signal transmitted from the optical pickup 103, a control operation for moving the optical pickup 103 in the radial direction of the optical disc 101 by driving the thread 104 using the thread drive circuit 118, a control operation for rotating the spindle motor 102 using the spindle drive circuit 119, and the like.

The system controller 120 according to this embodiment acquires levels of first, second, third, and fourth detection signals from the photo detector by lifting the objective lens upward from the down side in a state that a DVD laser diode is turned on, stores the levels of the detection signals in the RAM 114, and performs a focus-on operation using the focus drive circuit 116. Then, the system controller 120 stores the levels A, B, C, and D of the first, second, third, and fourth detection signals in the RAM 114, calculates a ratio of ((A+D) level/(B+C) level) in the direction of the X-axis, calculates a correction amount of lens shift corresponding to the calculated ratio of ((A+D) level/(B+C) level) based on a correction table that is set for the ratio of ((A+D) level/(B+C) level) in a stepped manner and represents a relationship between the ratio and the correction amount of lens shift within a movable range of the objective lens, and performs a tracking control operation such that the objective lens is shifted in the direction of the X-axis in accordance with the correction amount of the lens shift by using the tracking drive circuit 117.

Figure 2:
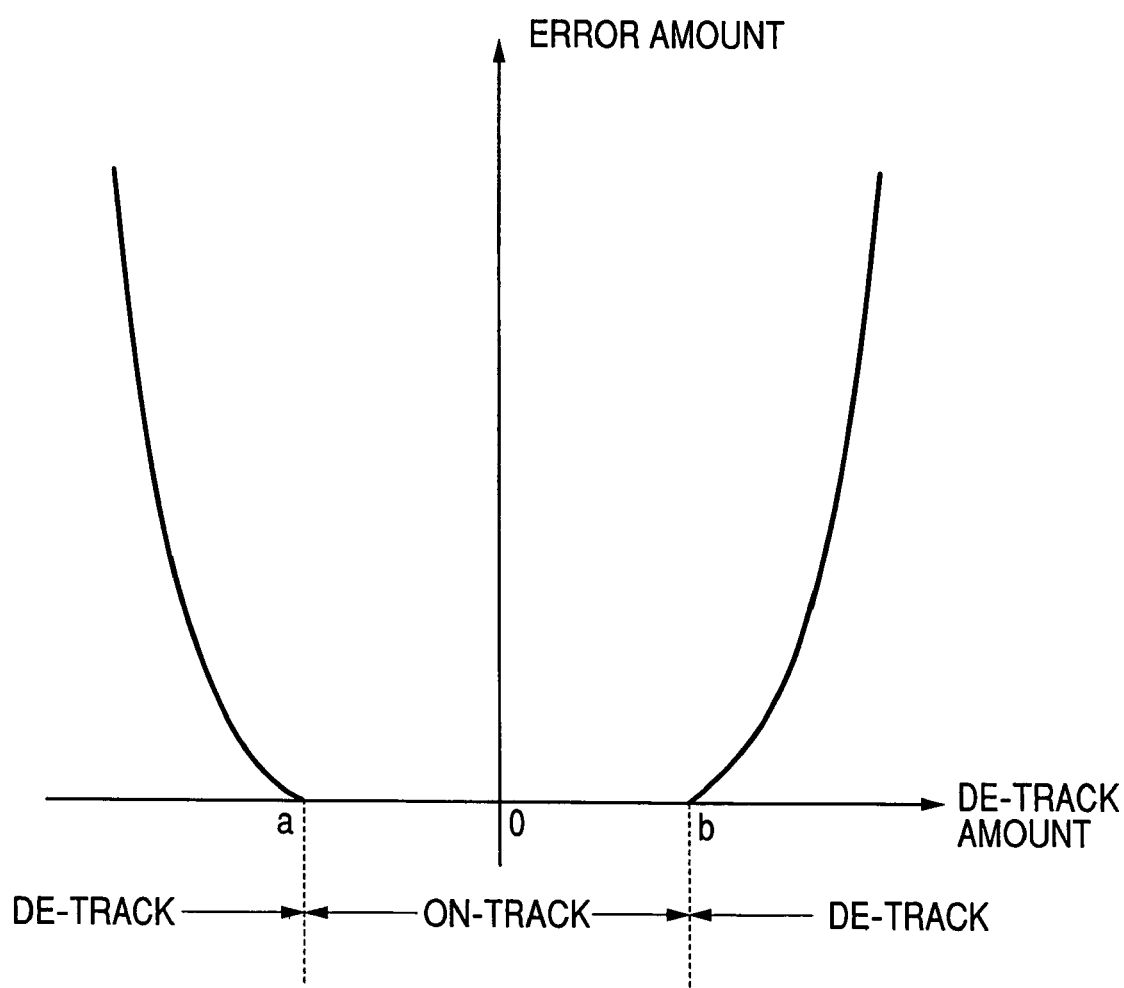
FIG. 2 is a diagram showing an on-track state and a de-track state in an optical disc reproducing apparatus according to the embodiment.

Here, the state of tracking will be described with reference to FIG. 2. A state that tracking is good is referred to as on-track, and a state that tracking is not good is referred to as de-track. The state that tracking is not good represents that the center of a spot for laser projection from the optical pickup is deviated from the center of a track. In FIG. 2, the vertical axis represents the amount of error indicating the number of times of cases where the CPU 115 has not been able to read out, the horizontal axis represents a deviation between the center of the spot for laser irradiation from the optical pickup and the track center. When the amount of error is within a specific range, the CPU 115 performs data correction by referring to adjacent data or the like, and thus it is possible to normally reproduce a video or audio that is viewed by a user. A range between a and b on the horizontal axis shown in FIG. 2 is the above-described range, and a position therebetween is referred to as on-track indicating that the tracking is normal. On the other hand, in a range that is smaller than a or larger than b, shown in FIG. 2, the state becomes de-track. In the range of de-track, the amount of error increases, and thus the jitter property is degraded, and thereby a block noise is generated in a reproduced image or the image is stopped. The track pitches are defined depending on the types of optical discs as below. The track pitch of a general optical disc is 1.60 μm (for a CD), 0.74 μm (for a DVD-ROM), or 0.615μm (for a DVD-ROM). In addition, the track pitch of a next-generation DVD is 0.32 μm (for a Blu-ray disc), 0.40 μm (for reproduction of an HD DVD), or 0.34 μ(for recording of an HD DVD).

Figure 3:
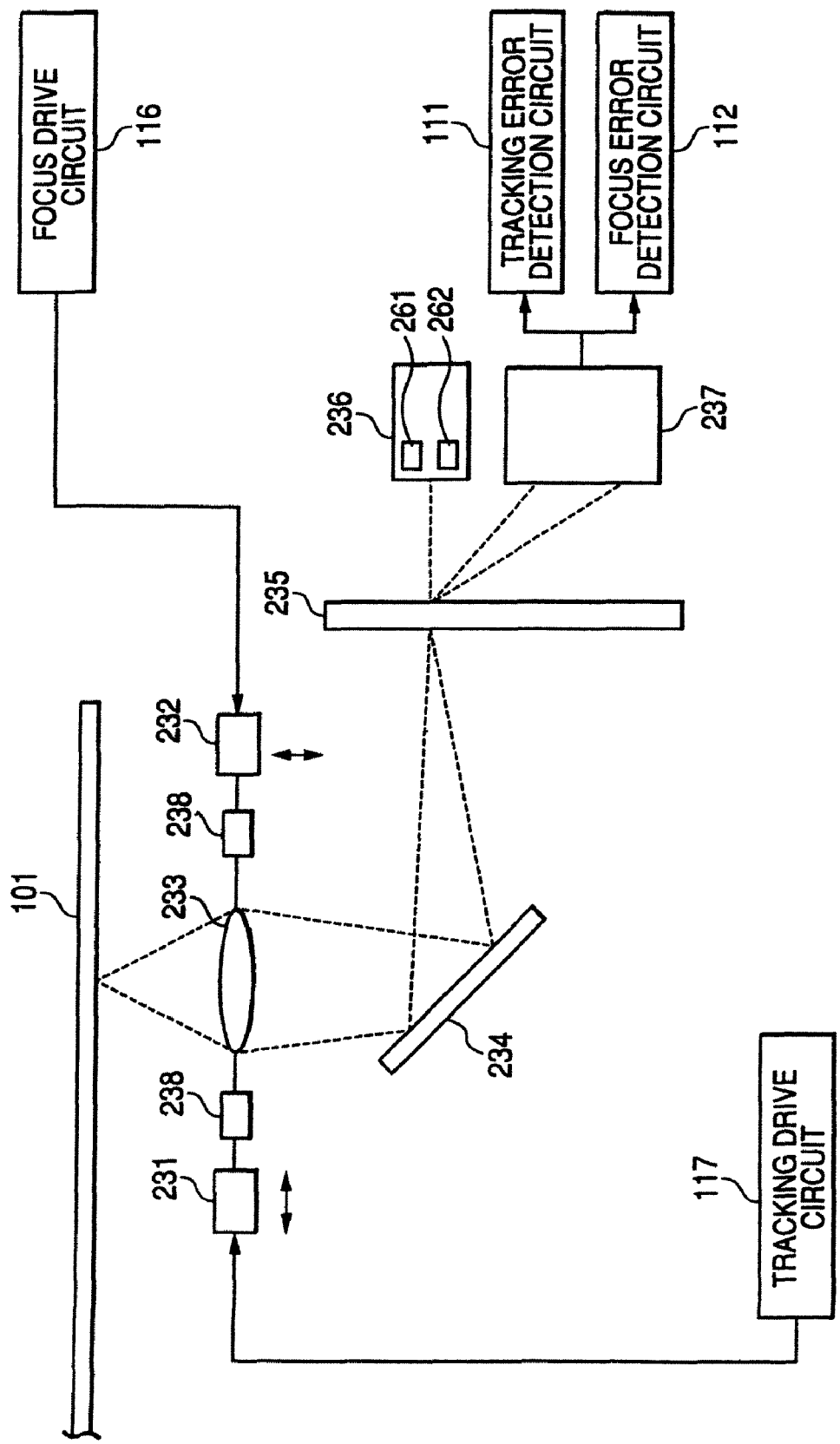
FIG. 3 is a block diagram for showing operations of an objective lens, a tracking actuator, and a focus actuator that are included in an optical pickup shown in FIG. 1.

FIG. 3 is a block diagram for describing operations of the objective lens, the tracking actuator, and the focus actuator that are included in the optical pickup shown in FIG. 1. In FIG. 3, a light source 236 has a DVD laser diode 261 and a CD laser diode 262 and emits laser beams. The laser beams emitted from the light source 236 are transmitted though a hologram element 235, reflected from a mirror 234, collected by an objective lens 233, and projected onto a spot of a recording surface of the optical disc 101. The returned light beams reflected from the recording surface of the optical disc 101 are collected by the objective lens 233 again, reflected by the mirror 234, divided into a plurality of groups of light fluxes at a time when the light beams pass through the hologram element 235, and incident to the four-division photo detector 237.

In the light beams reflected from the optical disc 101 which are collected by the objective lens 233, (+)/(−) primary optical components that have been diffracted by a track groove formed on the recording surface of the optical disc 101 are included. First and second areas that are areas divided into two including left and right areas in the direction of the track groove formed on the surface of the hologram element 235 are positioned such that optical signals that have been modulated as a (+) primary component and a (−) primary component pass through the areas. The returned light beams that have passed the first and second areas of the hologram element 235 are divided in different directions, collected by the four-division photo detector 237, and are photo-electrically modulated. The tracking error detection circuit 111 generates a tracking error signal by selecting a predetermined signal from among signals output from the four-division photo detector 237 and taking the phase difference thereof. In addition, the focus error detection circuit 112 generates a focus error signal by selecting a predetermined signal from among signals output from the four-division photo detector 237 and taking a difference therebetween.

A lens holder 238 in which the objective lens 233 is mounted is supported by the focus actuator 232 so as to be freely movable such that the lens holder is moved in a direction perpendicular to the recording surface of the optical disc 101. Accordingly, the lens holder 238 is driven by the focus actuator 232, and a focus drive voltage is supplied to the focus actuator 232 by the focus drive circuit 116 based on the focus error signal output from the focus error detection circuit 112. Then, a focus servo control operation is performed.

In addition, the lens holder 238 is supported by the tracking actuator 231 so as to be freely movable such that the lens holder moves in the radial direction (tracking direction) of the optical disc 101 with respect to the thread 104. Accordingly, the lens holder 238 is driven by the tracking actuator 231, and a tracking drive voltage is supplied to the tracking actuator 231 by the tracking drive circuit 117 based on the tracking error signal output from the tracking error detection circuit 111. Then, a tracking servo control operation is performed.

At this moment, the lens holder 238, that is, the objective lens 233 is shifted in the tracking direction in accordance with the eccentricity of the optical disc 101. However, the rotation frequency (eccentricity frequency) of the optical disc 101 is high, for example, in the range of several Hz to several tens of Hz. On the other hand, the frequency band of a transport operation of the thread 104 is low such as 1 Hz. Accordingly, in a tracking servo operation, only the objective lens 233 constantly follows the track groove of the optical disc 101, and the objective lens 233 is shifted with respect to the thread 104 due to the eccentricity of the track groove.

Figures 4, 5:
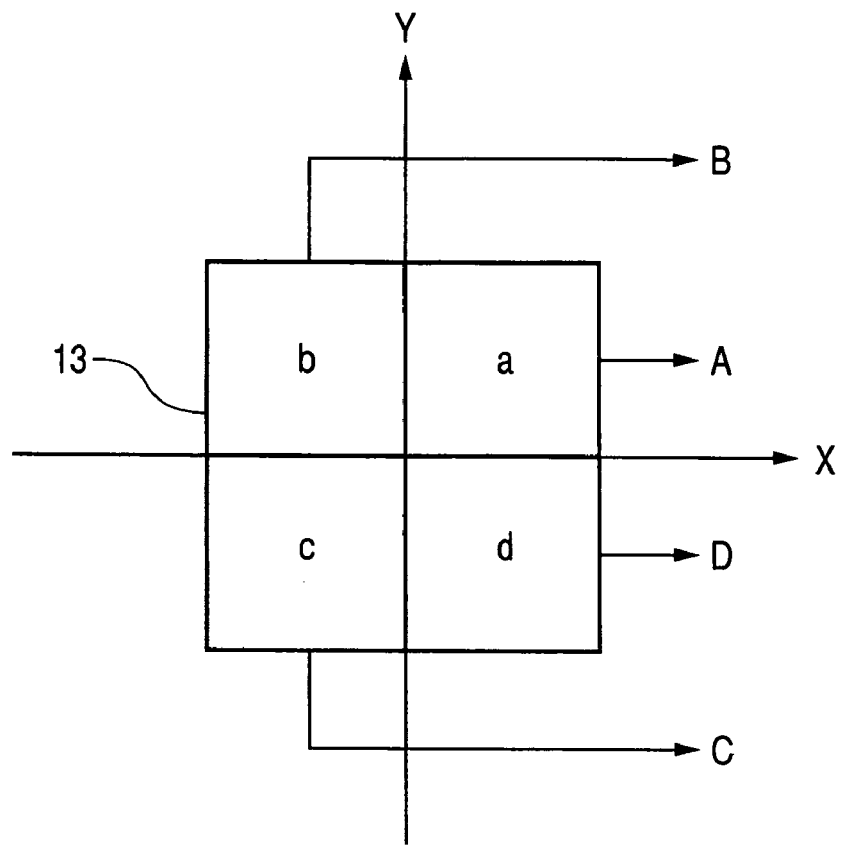
FIG. 4 is a diagram showing a light reception area of a four-division photo detector 237 according to the embodiment.
FIG. 5 is a diagram showing an example of a correction table representing a relationship between a ratio α and a correction amount of lens shift according to the embodiment.

FIG. 4 is a diagram for describing the photo detector 137 shown in FIG. 1 in detail. The photo detector 137 is divided into four. The X-axis represents the radial direction of the optical disc, and the Y-axis represents the track direction of the optical disc. In XY coordinates, a light reception area a is located in the first quadrant, a light reception area b is located in the second quadrant, a light reception area c is located in the third quadrant, and a light reception area d is located in the fourth quadrant. A reference sign A denotes a detection signal detected in the light reception area a, a reference sign B denotes a detection signal detected in the light reception area b, a reference sign C denotes a detection signal detected in the light reception area c, and a reference sign D denotes a detection signal detected in the light reception area d. The tracking error signal is (A+D)-(B+C), and the focus error signal acquired by using an astigmatism method is (A+C)-(B+D). Particularly in this embodiment, a ratio ((A+D) level/(B+C) level) of the signal level of (A+D) to the signal level of (B+C) is calculated.

FIG. 5 is a diagram showing an example of a correction table representing a relationship between the ratio a and the correction amount of lens shift according to an embodiment of the present invention. In the correction table shown in FIG. 4, α denotes the above-described ratio ((A+D) level/(B+C) level) in the unit of dB (decibel), and limits of the correction amount of lens shift are set to ±110 μm. When the ratio α is −3.0 dB, the correction amount of lens shift is ±110 μm. When the ratio α is larger than −3.0 dB and smaller than −1.5 dB. the correction amount of lens shift is +55 μm. On the other hand, when the ratio α is equal to or larger than −1.5 dB and is equal to or smaller than +1.5 dB, the correction amount of lens shift is 0 μm, and thereby the correction of lens shift is not performed. In other in words, when the ratio α is within ±1.5 dB, the correction amount of lens shift is 0 μm, and thereby the correction of lens shift is not performed. When the ratio α is larger than +1.5 dB and smaller than +3.0 dB, the correction amount of lens shift is −55 μm. When the ratio α is +3.0 dB, the correction amount of lens shift is −110 μm. In addition, the degree of movement of the objective lens 33 is set in consideration of the movable range of the lens. This correction table is store in the flash ROM 121 in advance.

Figure 6:
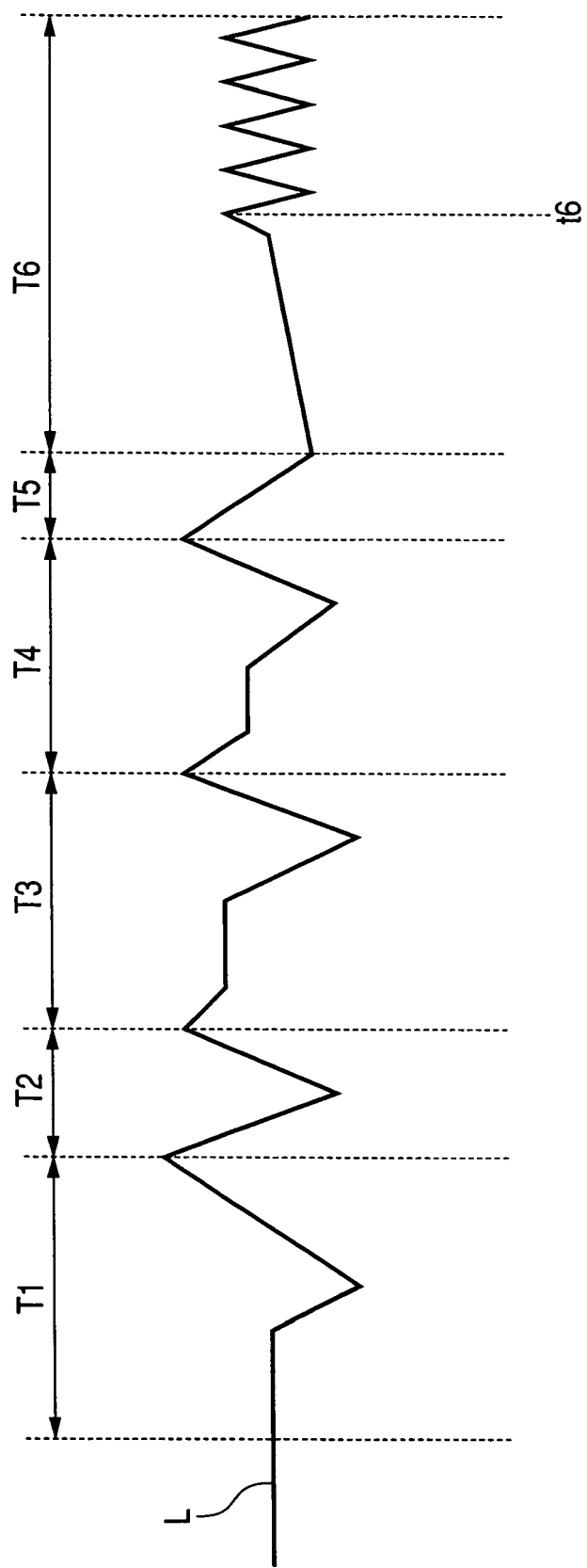
FIG. 6 is a timing chart according to the embodiment for showing each step including an operation for adding one point, started from a search operation in a state that a DVD laser diode of an optical pickup is turned on, until a focus-on operation is performed.

FIG. 6 is a timing chart according to an embodiment of the present invention for describing each step including an operation for adding one point, started from a search operation (an operation of the system controller for acquiring levels of the detection signals A, B, C, and D from the four-division photo detector by moving the objective lens upward from the down side) in a state that a DVD laser diode of an optical pickup is turned on, until a focus-on operation is performed.

In FIG. 6, a line L represents a voltage that is output from the focus drive circuit 116 and applied to the focus actuator 232. From the voltage of the line L, the upward direction from the down side corresponds to a direction (a direction close to the recording surface of the optical disc 1) for moving the objective lens 233 upward from the down side. Accordingly, the line L indicates a change in the level of the voltage applied to the focus actuator 232 from the focus drive circuit 116.

First, in a period T1, the detection signals A, B, C, and D from the four-division photo detector 237 are acquired in a state that the DVD laser diode 261 is turned on, a ratio, which is a ratio in the direction of the X-axis, of the (A+D) signal level to the signal level (B+C) is calculated. When the ratio exceeds a predetermined value, a control operation for shifting the objective lens 233 in the direction (a direction for canceling the light reception deviation) of the X-axis is performed.

In a period T2, in a state that the DVD laser diode 261 is turned on, a total sum signal (A+B+C+D) that is a reproduction signal (RF signal) and a focus error signal (A+C)-(B+D) are acquired and are used for adjusting the amplitude.

In a period T3, the focus error signal (A+C)-(B+D) is acquired in a state that the DVD laser diode 261 is turned on and the CD laser diode 262 is turned on, and is used for adjusting the amplitude of the signal.

In a period T4, amplitude adjustment operations for the detection signals A, B, C, and D for the DVD are individually performed. In a period T5, an S-letter balance adjustment operation for the focus error signal for the DVD and a focus lead-in setting operation are performed. In a period T6, a focus-on operation is performed at a time point t6.

Described in more detail, in the time period T1, the system controller 120 acquires levels of detection signals A, B, C, and D transmitted from the four-division photo detector 137 by lifting the objective lens 233 upward from the down side in a state that the DVD laser diode 261 is turned on and stores the levels of the detection signals in the RAM 114. Next, the system controller 120 calculates the ratio of ((A+D) level/(B+C) level) in the direction of the X-axis by referring to the levels of the detection signals A, B, C, and D that are stored in the RAM 114. When the calculated ratio of ((A+D) level/(B+C) level) exceeds a predetermined value, the system controller 120 calculates the correction amount of lens shift for the calculated ratio α based on the correction table (see FIG. 5) indicating a relationship between the ratio α and the correction amount of lens shift. When the calculated ratio a exceeds the predetermined value, the objective lens 233 is shifted in the X-axis direction (a direction for canceling the light reception deviation) by controlling the tracking drive circuit 117 in accordance with the above-described correction amount of lens shift. Since the ratio of ((A+D) level/(B+C) level) represents the level of a signal of (A+D) to the level of a signal of (B+C), the ratio is represented by ((A+D) level/(B+C) level) instead of (A+D)/(B+C).

In the period T2, the system controller 120 reflects the ratio and the correction amount of lens shift that have been calculated as above, and acquires the focus error signal of (A+C)-(B+D) by using the detection signals A, B, C, and D in a state that the DVD laser diode 261 is turned on.

In the period T3, the system controller 120 turns off the DVD laser diode 261; and acquires a sum signal of (A+B+C+D) and a focus error signal of (A+C)-(B+D) by using the detection signals A, B, C, and D in a state that the CD laser diode 362 is turned on.

In the period T4, the system controller reflects the ratio and the correction amount of lens shift that have been calculated as above. In addition, when the level of the DVD sum signal of (A+B+C+D) is higher than that of the CD sum signal of (A+B+C+D) and the system controller 120 determines that the inserted disc is a DVD, the system controller 120 individually adjusts the levels of the detection signals A, B, C, and D to be a constant level in a state that the DVD laser diode 261 is turned on. In addition, in the period T4, the system controller 120 performs a search operation by raising the level of the focus error signal to a target level.

In the period T5, the system controller 120 reflects the correction amount of lens shift calculated as above, and performs the S-letter balance adjustment operation for the focus error signal of (A+C)-(B+D) acquired as above in a state that the DVD laser diode 261 is turned on and a focus lead-in setting operation for leading in the focus servo. In the period T6, the focus is on at a time point of t6 by the focus servo using the focus error detection circuit 112, the focus drive circuit 116, and the focus actuator 232.

In this focus lead-in setting operation, the sum signal of (A+B+C+D) and the focus error signal of (A+C)-(B+D) are measured. When the amplitude of the focus error signal of (A+C)-(B+D) exceeds a half of a predetermined value of the focus error signal, a first condition is achieved. In addition, when the amplitude of the sum signal of (A+B+C+D) exceeds a half of a predetermined value of the sum signal after the first condition is achieved, a second condition is achieved. In addition, when a search operation for the optical disc 1 is performed by shifting the objective lens 233 upward, the focus becomes a just-focus, and thereby a third condition is achieved. Consequently, the focus lead-in setting operation means an operation for achieving the first, second, and third conditions and leading in the focus servo.

FIG. 7 shows a flow chart according to an embodiment of the present invention. As a series of reproduction operations of a DVD recording and reproducing apparatus, generally, a process is performed in the order of closing a tray→determining whether there is a disc→determining the disc type→focus-on→track-on→disc servo→reading data→reproducing and outputting an image. The present invention relates to a process between the focus-on and the track-on in the above-described process. Next, a flowchart according to an embodiment of the present invention will be described in detail with reference to FIG. 7. The flowchart is for describing operations including an operation for adding one point, started from performing a search operation (an operation in which the system controller acquires the levels of the detection signals A, B, C, and D transmitted from the four-division photo detector by moving the objective lens upward from the down side) in a state that a DVD laser diode of a pickup is turned on, until a focus-on operation is performed. Hereinafter, operations including an operation for adding one point, started from performing a search operation after a focus-on operation until another focus-on operation is performed will be described with reference to the flowchart and FIGS. 1 to 5.

First, the system controller 120 performs the focus-on operation by controlling the focus drive circuit 116 and driving the focus actuator 232 (Step S601). Next, the system controller 120 acquires the levels of the detection signals A, B, C, and D transmitted from the four-division photo detector 137 (Step S602), and stores the levels of the detection signals in the RAM 114 (Step S603).

Then, the system controller 120 calculates the ratio ((A+D) level/(B+C) level) in the direction of the X-axis and converts the ratio into a ratio α in the unit of decibel (Step S604). Next, the system controller 120 refers to the correction table (see FIG. 5), which indicates a relationship between the ratio α and the correction amount of lens shift, for the ratio α calculated in Step S604 (Step S605). Then, it is determined whether the calculated ratio α is a value larger than −1.5 and smaller than +1.5 (Step S606). When the ratio is determined to be beyond the above-described range, the system controller 120 calculates the correction amount of lens shift for the ratio α acquired from the correction table (Step S607).

Next, the system controller drives the tracking actuator 231 by controlling the tracking drive circuit 117 in accordance with the correction amount of lens shift calculated in Step S607 and shifts the objective lens 233 in the direction of the X-axis in which the light reception deviation of the four-division photo detector 237 is cancelled (Step S609).

Next, the system controller 120 reflects the correction amount of the lens shift in a case where the objective lens 233 is shifted and acquires a sum signal of (A+B+C+D) and a focus error signal of (A+C)-(B+D) in a state that the DVD laser diode 261 is turned on. Next, the system controller 120 reflects the correction amount of lens shift in the same manner, performs an S-letter balance adjustment operation for the focus error signal (A+C)-(B+D) acquired as above and a focus lead-in setting operation for leading in the focus servo in a state that the laser diode 261 is turned on, and then performs a focus-on operation by the focus servo operation using the focus drive circuit 116 and the focus actuator 232 (Step S610). On the other hand, when determining that the ratio is within the above-described range in Step S606, the system controller 120 does not perform a correction operation and proceeds to a process after the focus-on operation (Step S608).

According to this embodiment, the system controller 120 adds a search operation that is an operation for acquiring the detection signals A, B, C, and D of the photo detector 137 by lifting the objective lens 233 upward from the down side in a status that the laser diode 261 is turned on, and calculates the ratio of ((A+D) level/(B+C) level) in the direction of the X-axis after acquisition of the detection signals A, B, C, and D. Then, only when the ratio is larger than a predetermined value, the correction amount of lens shift in accordance with the added search operation is employed. Accordingly, the de-track (a status that a track-on operation is performed in a location deviated from the center of a track) can be reduced by calculating the amounts of deviations of light reception in the light reception areas a, b, c, and d of the photo detector 137 in the direction of the X-axis in the search operation and moving and lifting the objective lens 233 in a direction for canceling the deviations. As a result, the reproduction quality of a DVD is improved.

FIG. 8 shows data acquired for verifying values in the correction table shown in FIG. 5 according to an embodiment of the present invention. Data is acquired from ten DVD recording and reproducing apparatus samples having various photo detection deviations, and the ratio of ((A+D)/(B+C)) is taken in the vertical axis, and the correction amount of lens shift is taken in the horizontal axis. In this verification process, the lens shift is intentionally performed in a stepped manner, and the ratio of ((A+D)/(B+C) for the lens shift is calculated for drawing a graph. A solid line in the graph represents a state that the amount of each sample device is zero, and denotes a state of the photo detection deviation in a case where the focus-on operation is performed in an initial state. A vertical broken line in the graph represents ±110 μm that indicates a movable range of the lens. A horizontal broken line represents ±3.0 dB, and a horizontal dotted line represents a threshold value of ±1.5 dB.

As can be known from the line representing the threshold value in the graph, a ratio α located above the horizontal broken line of +3.0 dB in the initial state represents the correction amount of lens shift of −110 dB μm that is the lower limit of the movable range of the lens. For a ratio α located below the horizontal broken line of −3.0 dB, the lens is shifted with the correction amount of lens shift of +110 μm dB that is the higher limit of the movable range of the lens, and thereby the amount of the photo detection deviation is adjusted by being pressed up toward zero of the vertical axis. In addition, the amount of the photo detection deviation is adjusted by being pressed up toward zero of the vertical axis by shifting the lens with the correction amount of the lens shift of −55 μm dB in a case where the ratio α is in the range of +1.5 dB of the horizontal dotted line to the broken line +3.0 dB or by shifting the lens with the correction amount of the lens shift of +55 μm dB in a case where the ratio α is in the range of −3.0 dB of the horizontal broken line to the dotted line of −1.5 dB. On the other hand, when the ratio α is in the range of the dotted lines of −1.5 dB to +1.5 dB, the problem in reproduction capability does not occur without performing a lens shift operation, and thereby the correction operation for the lens shift is not performed.

As described above, the lens is shifted intentionally, the ratio for the lens shift is calculated and plotted, and thereby an optimal amount of lens shift is calculated in a reverse manner so as to configure the correction table shown in FIG. 5.

The present invention can be used in a DVD player or a DVD recorder that reproduces information recorded in a DVD or a CD by using an optical pickup. More particularly, the present invention can be used in a process for correcting light reception deviation of a photo detector due to lens shift in a search process of the optical pickup. In addition, the present invention can be used in a tracking control operation for a next-generation. DVD such as a Blu-ray disc or an HD DVD that has a track pitch smaller than that of a general optical disc such as a CD or a DVD.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disc recording and reproducing apparatus comprising:
   an optical pickup that has a photo detector of which a light reception area is divided into four areas including a first quadrant, a second quadrant, a third quadrant and a fourth quadrant by an X-axis and a Y-axis in a case where a radial direction of an optical disc is set to the X-axis and a track direction of the optical disc is set to the Y-axis, and that is configured to project a laser beam emitted from a laser diode onto the optical disc through an objective lens, receive the laser beam reflected from the optical disc by the photo detector, and output first, second, third and fourth detection signals from the first, second, third and fourth quadrants of the light areas;
   a focus servo section that is configured to shift the objective lens in a direction perpendicular to a recording surface of the optical disc;
   a system controller that is interconnected between the optical pickup and the focus servo section and is operable to control the optical pickup;
   a first memory that is configured to store levels of the first, second, third and fourth detection signals which are detected by the photo detector as A, B, C and D when the focus servo section lifts the objective lens up in a state that the laser diode is turned on;
   a tracking servo section that is configured to shift the objective lens in the radial direction of the optical disc; and
   a second memory that stores a correction table which represents a relationship between a ratio of ((A+D)/(B+C)) in the X-axis and a correction amount of lens shift in a stepped manner within a movable range of the objective lens;
   wherein the system controller calculates the ratio of ((A+D)/(B+C)) based on the levels A, B, C and D which are stored in the first memory after the focus servo section performs a focus-on operation;
   wherein the system controller controls the tracking servo section to perform a tracking operation so as to shift the objective lens in the direction of the X-axis by the correction amount with respect to the calculated ratio ((A+D)/(B+C)) based on the correction table.

2. An optical disc recording and reproducing apparatus comprising:
   an optical pickup that has a photo detector of which a light reception area is divided into four areas including a first quadrant, a second quadrant, a third quadrant and a fourth quadrant by an X-axis and a Y-axis in a case where a radial direction of an optical disc is set to the X-axis and a track direction of the optical disc is set to the Y-axis, and that is configured to project a laser beam emitted from a laser diode onto the optical disc through an objective lens, receive the laser beam reflected from the optical disc by the photo detector, and output first, second, third and fourth detection signals from the first, second, third and fourth quadrants of the light areas;
   a focus servo section that is configured to shift the objective lens in a direction perpendicular to a recording surface of the optical disc;
   a system controller that is interconnected between the optical pickup and the focus servo section and is operable to control the optical pickup;
   a memory that is configured to store levels of the first, second, third and fourth detection signals which are detected by the photo detector as A, B, C and D when the focus servo section lifts the objective lens up in a state that the laser diode is turned on; and
   a tracking servo section that is configured to shift the objective lens in the radial direction of the optical disc,
   wherein the system controller controls the memory to store levels of the first, second, third and fourth detection signals as A, B, C and D after the focus servo section performs a focus-on operation, and then, calculates a ratio of ((A+D)/(B+C)) in the direction of the X-axis; and
   wherein the system controller controls the tracking servo section to perform a tracking operation so as to shift the objective lens in the direction of the X-axis based on a correction table which represents a relationship between correction amount of lens shift and the calculated ratio ((A+D)/(B+C)).

3. The optical disc recording and reproducing apparatus as set forth in claim 2, wherein the correction amount of lens shift is set with respect to the ratio of ((A+D)/(B+C)) in a stepped manner within a movable range of the objective lens.

4. The optical disc recording and reproducing apparatus as set forth in claim 2, wherein the optical disc recording and reproducing apparatus reproduces at least one of a CD, a DVD, a Blu-ray Disc and an HD DVD.

* * * * *